(12) United States Patent
Rioux

(10) Patent No.: US 8,998,563 B2
(45) Date of Patent: Apr. 7, 2015

(54) ACTIVE CLEARANCE CONTROL FOR GAS TURBINE ENGINE

(75) Inventor: Philip Robert Rioux, North Berwick, ME (US)

(73) Assignee: United Technologies Corporation, Hartford, CT (US)

( * ) Notice: Subject to any disclaimer, the term of this patent is extended or adjusted under 35 U.S.C. 154(b) by 360 days.

(21) Appl. No.: 13/491,868

(22) Filed: Jun. 8, 2012

(65) Prior Publication Data

US 2013/0330167 A1    Dec. 12, 2013

(51) Int. Cl.
*F01D 11/24* (2006.01)
*F01D 25/12* (2006.01)
*F01D 25/14* (2006.01)
*F02C 7/00* (2006.01)
*F02C 7/32* (2006.01)
*F02C 9/00* (2006.01)

(52) U.S. Cl.
CPC . *F02C 7/00* (2013.01); *F01D 11/24* (2013.01); *F02C 7/32* (2013.01); *F02C 9/00* (2013.01)

(58) Field of Classification Search
USPC ............... 415/1, 115, 116, 173.1–173.5, 415/175–178, 14, 17, 47
See application file for complete search history.

(56) References Cited

U.S. PATENT DOCUMENTS

| | | | |
|---|---|---|---|
| 4,019,320 A | 4/1977 | Redinger, Jr. et al. | |
| 4,426,191 A | 1/1984 | Brodell et al. | |
| 4,525,997 A | 7/1985 | Baran, Jr. | |
| 4,553,901 A * | 11/1985 | Laurello | 415/138 |
| 4,566,851 A | 1/1986 | Comeau et al. | |
| 4,721,433 A | 1/1988 | Piendel et al. | |
| 4,752,184 A | 6/1988 | Liang | |
| 4,793,772 A | 12/1988 | Zaehring et al. | |
| 5,100,291 A * | 3/1992 | Glover | 415/115 |
| 5,127,794 A | 7/1992 | Burge et al. | |
| 5,152,666 A | 10/1992 | Stripinis et al. | |
| 5,169,287 A * | 12/1992 | Proctor et al. | 415/115 |

(Continued)

FOREIGN PATENT DOCUMENTS

EP    1 798 381 A2    6/2007
EP    1 923 539 A2    5/2008

OTHER PUBLICATIONS

International Search Report for PCT Application No. PCT/US2013/041786, Jul. 29, 2013.

(Continued)

*Primary Examiner* — Christopher Verdier
(74) *Attorney, Agent, or Firm* — Carlson, Gaskey & Olds, P.C.

(57) ABSTRACT

An active clearance control system for a gas turbine engine includes a structural member that is configured to be arranged near a blade tip. A plenum includes first and second walls respectively providing first and second cavities. The first wall includes impingement holes. The plenum is arranged over the structural member. A fluid source is fluidly connected to the second cavity to provide an impingement cooling flow from the second cavity through the impingement holes to the first cavity onto the structural member. A method includes the steps of providing a conditioning fluid to an outer cavity of a plenum providing an impingement cooling flow through impingement holes from an inner wall of the plenum to an inner cavity, directing the impingement cooling flow onto a structural member, and conditioning a temperature of the structural member with the impingement cooling flow to control a blade tip clearance.

15 Claims, 2 Drawing Sheets

(56) References Cited

U.S. PATENT DOCUMENTS

| | | | |
|---|---|---|---|
| 5,281,085 A * | 1/1994 | Lenahan et al. | 415/116 |
| 5,399,066 A * | 3/1995 | Ritchie et al. | 415/115 |
| 6,089,821 A * | 7/2000 | Maguire et al. | 415/115 |
| 6,659,716 B1 * | 12/2003 | Laurello et al. | 415/116 |
| 6,902,371 B2 | 6/2005 | Anderson, Jr. et al. | |
| 7,090,462 B2 | 8/2006 | Martin et al. | |
| 7,491,029 B2 | 2/2009 | Pezzetti, Jr. et al. | |
| 2006/0193721 A1 * | 8/2006 | Adam et al. | 415/177 |
| 2007/0086887 A1 * | 4/2007 | Pezzetti et al. | 415/173.1 |
| 2008/0063509 A1 * | 3/2008 | Sutherland et al. | 415/14 |
| 2008/0112797 A1 * | 5/2008 | Seitzer et al. | 415/116 |
| 2010/0071382 A1 * | 3/2010 | Liang | 60/806 |
| 2011/0229306 A1 | 9/2011 | Lewis et al. | |
| 2011/0236179 A1 * | 9/2011 | Rog et al. | 415/1 |
| 2012/0121381 A1 * | 5/2012 | Charron et al. | 415/115 |

OTHER PUBLICATIONS

International Preliminary Report on Patentability for International Application No. PCT/US2013/041786 mailed Dec. 18, 2014.

* cited by examiner

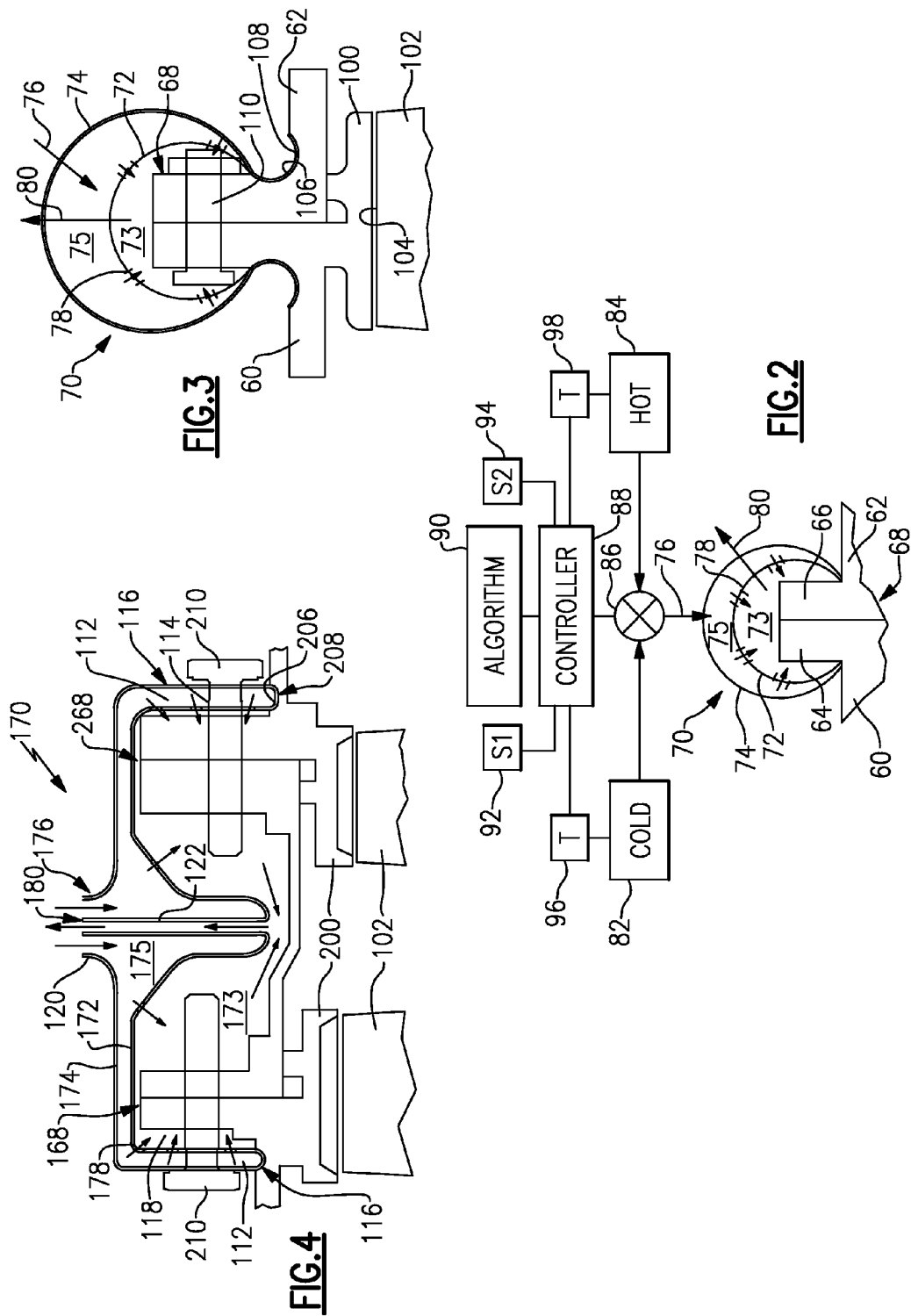

ACTIVE CLEARANCE CONTROL FOR GAS TURBINE ENGINE

BACKGROUND

This disclosure relates to an active clearance control system and method for a gas turbine engine. More particularly, the disclosure relates to controlling a temperature of a structural member, such as a case, to control the clearance between the case and a blade.

Gas turbine engine blades are housed within structural members, such as cases, having annular flanges that are secured to one another at a joint by fasteners. In one example, the case may support a blade outer air seal that is arranged radially outwardly from tips of the blades. A clearance is provided between the blade outer air seal and the tips. This clearance affects the blade tip wear as well as the efficiency of the fluid flowing through the blades.

It may be desirable to control the clearance between the case and the blades. One example passive arrangement has used a heat shield secured over a pair of flanges, which insulates the cases from the hotter environment external to the cases. Another example arrangement provides a blade outer air seal having a hollow cavity that is provided fluid. Cooling fluid from the cavity is supplied to impingement holes that provide the cooling fluid to a back side of the blade outer air seal. This cooling fluid enters the blade flow path, which may be undesired.

SUMMARY

In one exemplary embodiment, an active clearance control system for a gas turbine engine includes a structural member that is configured to be arranged near a blade tip. A plenum includes first and second walls respectively providing first and second cavities. The first wall includes impingement holes. The plenum is arranged over the structural member. A fluid source is fluidly connected to the second cavity and is configured to provide an impingement cooling flow from the second cavity through the impingement holes to the first cavity onto the structural member.

In a further embodiment of any of the above, the system includes a valve that is fluidly connected between the fluid source and the plenum and is configured to selectively provide fluid to the second cavity.

In a further embodiment of any of the above, the fluid source is fan air.

In a further embodiment of any of the above, the fluid source is rear hub air.

In a further embodiment of any of the above, the system includes a controller in communication with the valve and is configured to provide a command to selectively provide fluid to the plenum.

In a further embodiment of any of the above, the system includes an algorithm and multiple sensors in communication with the controller and is configured to provide information relating to a clearance condition between the structural member and the blade tip. The controller commands the valve to selectively provide fluid to the plenum.

In a further embodiment of any of the above, the system includes first and second structural members having flanges secured to one another by fasteners at a joint. The plenum is arranged over the joint.

In a further embodiment of any of the above, at least one of the first and second structural members includes a blade outer air seal that is arranged adjacent to the blade tip.

In a further embodiment of any of the above, the blade outer air seal is integral with the structural member.

In a further embodiment of any of the above, the system includes multiple joints. The plenum is arranged over the multiple joints.

In a further embodiment of any of the above, the structural member includes a first interlocking position, and the plenum includes a second interlocking portion cooperating with the first interlocking portion to maintain the plenum relative to the structural member in a desired position.

In a further embodiment of any of the above, the first and second walls are concentric C-shaped structures that are secured to one another to provide the first and second cavities.

In another exemplary embodiment, a plenum for a gas turbine engine clearance control system includes first and second walls spaced apart from one another with the first wall arranged interiorly of the second wall. The first wall includes multiple impingement holes, and an interlocking feature is provided on the plenum and configured to cooperate with the corresponding interlocking feature on a structural member to locate the plenum relative to the structural member in a desired position.

In a further embodiment of any of the above, the first and second walls are concentric C-shaped structures that are secured to one another to provide the first and second cavities.

In a further embodiment of any of the above, the first and second walls provide a unitary structure.

In a further embodiment of any of the above, the first and second walls are stamped sheet metal.

In another exemplary embodiment, a method of actively controlling a clearance in a gas turbine engine includes the steps of providing a conditioning fluid to an outer cavity of a plenum, providing an impingement cooling flow through impingement holes from an inner wall of the plenum to an inner cavity, directing the impingement cooling flow onto a structural member, and conditioning a temperature of the structural member with the impingement cooling flow to control a clearance between the structural member and a blade tip.

BRIEF DESCRIPTION OF THE DRAWINGS

The disclosure can be further understood by reference to the following detailed description when considered in connection with the accompanying drawings wherein:

FIG. 2 is a schematic view of an example active clearance control system having a plenum associated with a structural member.

FIG. 3 is a more detailed schematic view of the structural members and the plenum illustrated in FIG. 2.

FIG. 4 is another example embodiment of a plenum and case structure.

DETAILED DESCRIPTION

Figure 1:
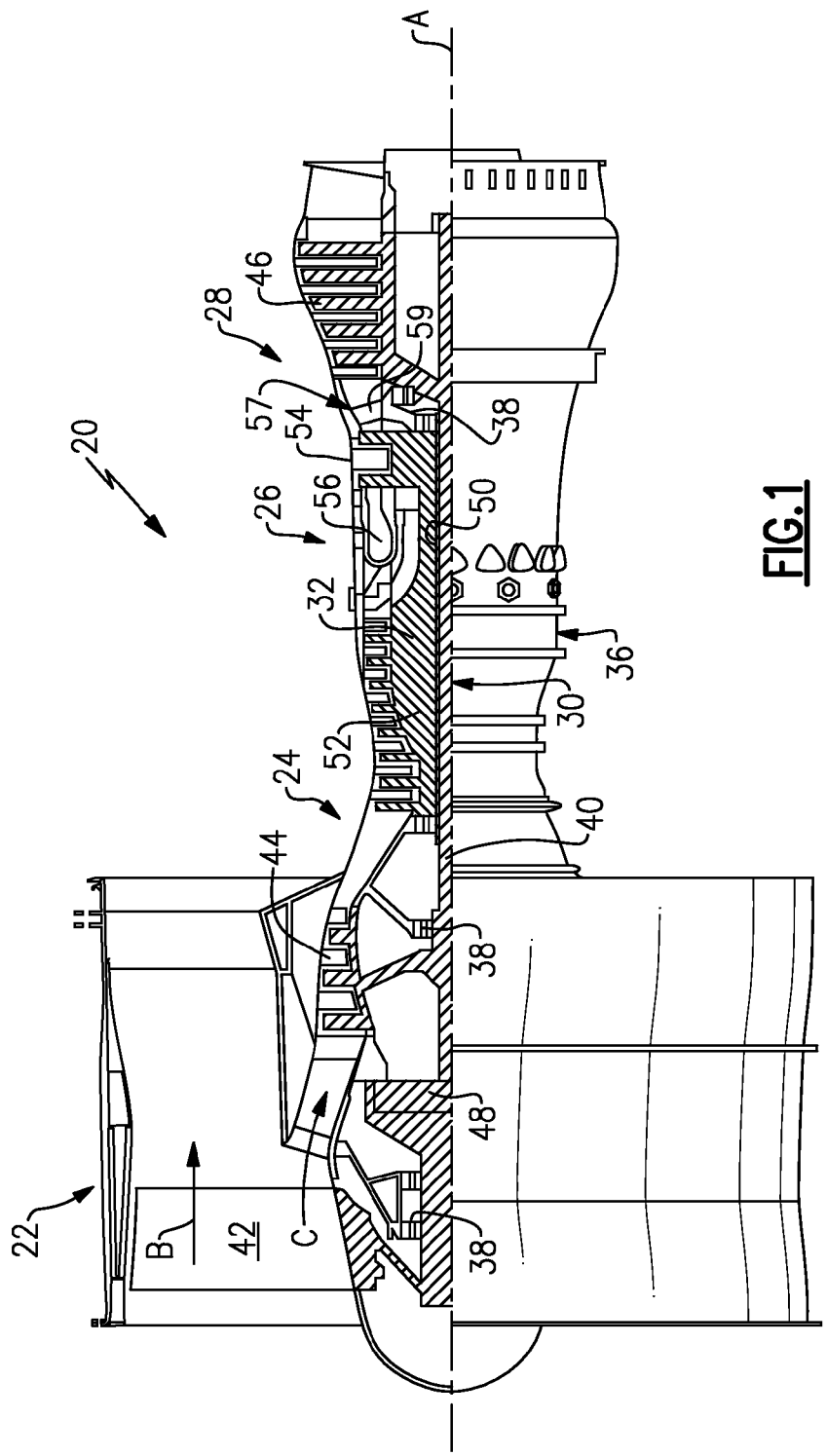
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure (or first) compressor section 44 and a low pressure (or first) turbine section 46. The inner shaft 40 is connected to the fan 42 through a geared architecture 48 to drive the fan 42 at a lower speed than the low speed spool 30. The high speed spool 32 includes an outer shaft 50 that interconnects a high pressure (or second) compressor section 52 and high pressure (or second) turbine section 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned per hour divided by lbf of thrust the engine produces at that minimum point. "Fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

Referring to FIG. 2, an example active clearance control system is schematically illustrated in FIG. 2. The system includes first and second structural members 60, 62, which may correspond to cases. In one example, the cases are provided in the high pressure compressor section 52, although it should be understood that the cases may be provided in other sections of the gas turbine engine 20. The first and second structural members 60, 62 respectively include first and second flanges 64, 66 providing a joint 68.

A plenum 70, which may be annular in shape with a C-shaped cross-section, is arranged over the joint 68. The plenum 70 is provided at the joint 68 to avoid thermally expanding or contracting one flange more than the other, which would create stress at the joint. The plenum 70 includes first and second walls 72, 74 that are arranged to provide first and second cavities 73, 75. An inlet 76 communicates a temperature conditioning fluid to the second cavity 75. Impingement holes 78 are provided in the first wall 72, and fluid flows from the second cavity 75 to the first cavity 73 through the impingement holes 78. The fluid impinges upon the joint 68, which thermally conditions the first and second structural members 60, 62 to control the diameter of the cases by thermal means. An outlet 80 is in fluid communication with the first cavity 73 and permits the fluid to escape the plenum 70.

"Hot" and/or "cold" fluid may be provided to the plenum 70 to heat or cool the first and second structural members 60, 62 depending upon the clearance desired. In one example, the "cold" fluid is supplied by fan air, and the "hot" fluid is supplied by diffuser or rear hub air from the high pressure turbine 54. In one example, both cold and hot fluid sources 82, 84 are fluidly connected to the inlet 76 by a mixing valve 86. Although a single valve is illustrated, it should be understood that more valves may be used, or the valve may be entirely eliminated.

A controller 88 is in communication with the valve 86 and is configured to provide a command to the valve 86 to selectively introduce hot and/or cold fluid. In one example, the controller 88 communicates with an algorithm 90, first and second sensors 92, 94 and/or first and second temperatures sensors 96, 98. The first and second sensors 92, 94 may correspond to a throttle position, spool speed, temperature, pressure or other information from which the clearance condition associated with the first and second structural members 60, 62 may be inferred. The first and second temperatures sensors 96, 98 may be respectively associated with the cold and hot fluid sources 82, 84. It should be understood that fewer or more sensors than those illustrated in FIG. 2 may be used. The controller 88 heats or cools, as needed, the cases during transient conditions to control the clearance between the cases and blades.

A portion of the clearance control system illustrated in FIG. 2 is shown in more detail in FIG. 3. Fasteners 110 secure the first and second structural members 60, 62 at the joint 68. In the example, the first structural member 60 includes an integral blade outer air seal 100 that is arranged radially outwardly of a blade 102. A clearance is provided between the blade outer air seal 100 and a tip 104 of the blade 102. The fluid is provided to the plenum 70 to control the clearance between the tip 104 and the blade outer air seal 100.

The plenum 70 may be provided by stamped sheet metal. In one example, the first and second walls 72, 74 are secured to one another to provide a unitary structure.

In one example, at least one of the first and second structural members 60, 62 includes a first interlocking portion 106 that cooperates with a corresponding second interlocking portion 108 of the plenum 70. In the example illustrated, the first interlocking portion 106 is provided by an annular recess, and the second interlocking portion 108 is provided by a curved wall at opposing ends of the second wall 74. The interlocking portions locate the plenum relative to the cases and create an air seal.

Another example arrangement is illustrated in FIG. 4. Blade outer air seals 200 are arranged radially adjacent to the blades 102. In the example shown, the plenum 170 straddles multiple joints 168, 268. The first and second walls 172, 174 may be provided by a generally continuous structure, which may include multiple stamped components seam-welded to one another.

The second cavity 175 may extend radially inwardly to provide pockets 112 at either axial end of the plenum 170. The plenum 170 includes holes 114 in the end portions 116 provided the pockets 112. The holes 114 receive the fasteners 210, which secure the plenum 170 to the joints 168, 268. A gap 118 is provided axially between the end portion 116 and the joints 168, 268 to expose the joints 168, 268 to impingement cooling flow. The first and second interlocking portions 206, 208 locate the end portions 116 relative to the structural members to provide the desired gap as well as an air seal.

The first wall 172 provides an outlet tube 122 that fluidly communicates with the first cavity 173, and the second wall 174 provides the inlet tube 120 that fluidly communicates with the second cavity 175. Impingement holes 178 are provided in the first wall 172. The inlet and outlet tubes 120, 122 are concentric with one another in the example and provide the inlet 176 and outlet 180.

Although an example embodiment has been disclosed, a worker of ordinary skill in this art would recognize that certain modifications would come within the scope of the claims. For that reason, the following claims should be studied to determine their true scope and content.

What is claimed is:

1. An active clearance control system for a gas turbine engine comprising:
   a structural member configured to be arranged near a blade tip;
   a plenum including first and second walls respectively providing first and second cavities, the first wall including impingement holes, the plenum arranged over the structural member; and
   a fluid source fluidly connected to the second cavity and configured to provide an impingement cooling flow from the second cavity through the impingement holes to the first cavity onto the structural member, wherein the first and second walls are concentric C-shaped structures secured to one another to provide the first and second cavities.

2. The system according to claim 1, comprising a valve fluidly connected between the fluid source and the plenum and configured to selectively provide fluid to the second cavity.

3. The system according to claim 2, wherein the fluid source is fan air.

4. The system according to claim 2, wherein the fluid source is rear hub air.

5. The system according to claim 2, comprising a controller in communication with the valve and configured to provide a command to selectively provide fluid to the plenum.

6. The system according to claim 5, comprising an algorithm and multiple sensors in communication with the controller and configured to provide information relating to a clearance condition between the structural member and the blade tip, the controller commanding the valve to selectively provide fluid to the plenum.

7. The system according to claim 1, comprising wherein the structural member comprises first and second structural members having flanges secured to one another by fasteners at a joint, the plenum arranged over the joint.

8. The system according to claim 7, wherein at least one of the first and second structural members includes a blade outer air seal arranged adjacent to the blade tip.

9. The system according to claim 8, wherein the blade outer air seal is integral with the structural member.

10. The system according to claim 7, comprising multiple joints, the plenum arranged over the multiple joints.

11. The system according to claim 1, wherein the structural member includes a first interlocking portion, and the plenum includes a second interlocking portion cooperating with the first interlocking portion to maintain the plenum relative to the structural member in a desired position.

12. An active clearance control system for a gas turbine engine comprising:
    first and second structural members having flanges secured to one another by fasteners to provide a flange joint;
    a plenum arranged over the flange joint to provide a first cavity, the plenum includes first and second walls spaced apart from one another to provide a second cavity, the first wall arranged interiorly of the second wall, the first wall including multiple impingement holes, and an interlocking feature provided by at least one of the first and second walls is configured to directly engage a corresponding interlocking feature on the flange joint to locate the plenum relative to the first and second structural members in a desired position.

13. The system according to claim 12, wherein the first and second walls provide a unitary structure.

14. The system according to claim 12, wherein the first and second walls are stamped sheet metal.

15. A plenum for a gas turbine engine clearance control system comprising:
    first and second walls spaced apart from one another with the first wall arranged interiorly of the second wall, the first wall including multiple impingement holes, and an interlocking feature provided on the plenum and configured to cooperate with the corresponding interlocking feature on a structural member to locate the plenum relative to the structural member in a desired position, wherein the first and second walls are concentric C-shaped structures secured to one another to provide the first and second cavities.

* * * * *